United States Patent [19]

Wingler et al.

[11] Patent Number: 4,937,286
[45] Date of Patent: Jun. 26, 1990

[54] THERMOPLASTIC MOULDING COMPOSITIONS

[75] Inventors: Frank Wingler, Leverkusen; Klaus Sümmermann, Cologne; Ulrich Jansen, Dormagen; Joachim Döring, Langenfeld; Alfred Pischtschan, Kuerten, all of Fed. Rep. of Germany

[73] Assignee: Bayer Aktiengesellschaft, Leverkusen, Fed. Rep. of Germany

[21] Appl. No.: 107,155

[22] Filed: Oct. 13, 1987

[30] Foreign Application Priority Data

Oct. 24, 1986 [DE] Fed. Rep. of Germany ....... 3636191

[51] Int. Cl.$^5$ .............................................. C08L 51/04
[52] U.S. Cl. ..................................... 525/74; 524/504; 525/75; 525/76; 525/80; 525/85
[58] Field of Search ...................... 525/74, 76, 75, 80, 525/85

[56] References Cited

U.S. PATENT DOCUMENTS 4,302,378 11/1981 Lindner et al. ........................ 525/74
4,569,969 2/1986 Jones et al. ........................... 525/74

FOREIGN PATENT DOCUMENTS 0204357 12/1986 European Pat. Off. .

Primary Examiner—Jacob Ziegler
Attorney, Agent, or Firm—Connolly and Hutz

[57] ABSTRACT

Thermoplastic moulding compositions of

A. 90 to 30 parts by weight of a copolymer prepared by solution or bulk polymerization of $a_1$ 30 to 45% by weight of α-methylstyrene, $a_2$ 26 to 35% by weight of acrylonitrile and $a_3$ 44 to 20% by weight of styrene and/or p-methylstyrene, and with a content of incorporated acrylonitrile of 27–30% by weight, B. 5 to 60 parts by weight of a random copolymer of $b_1$ 18 to 24% by weight of maleic anhydride and $b_2$ 82 to 76% by weight of styrene and/or p-methylstyrene and C. 5 to 40 parts by weight of a graft polymer of 70 to 30% by weight of a mixture of $c_1$ a vinylaromatic and/or $C_1$–$C_4$-alkyl and $c_2$ acrylonitrile, on 30 to 70% by weight of a rubber with a glass transistion temperature of less than −10° C.

3 Claims, No Drawings

THERMOPLASTIC MOULDING COMPOSITIONS

The invention relates to polymer mixtures of

A. an α-methylstyrene/styrene/acrylonitrile terpolymer prepared in bulk or in solution, B. a randomly built up maleic anhydride/styrene polymer and C. a graft copolymer which contains a vinylaromatic and acrylonitrile graft-polymerized onto a rubber base with a glass transition temperature of less than −10 C., which are suitable as thermoplastic moulding compositions with a high impact strength and heat distortion point.

Styrene in the components can be replaced by p-methylstyrene, and instead of styrene or p-methylstyrene, the components can also contain corresponding portions of methyl methacrylate.

High impact strength thermoplastic moulding compositions of thermoplastic acrylonitrile copolymers and graft copolymers of vinylaromatics, methyl methacrylate and/or acrylonitrile on rubbers with a glass transition temperature of the graft bases of less than −10° C. are known.

These compositions fall under the generic names ABS (based on polydiene), ASA (based on acrylate rubber) and EPAS (based on ethylene/propylene copolymer rubbers). They are distinguished by a good chemical resistance and high impact strength, and are therefore used for domestic appliances, for housing for electronic equipment and in car construction. In recent years, the requirements of heat distortion point have increased. For many applications, the heat distortion point of the ABS, ASA and EPAS moulding compositions, which is in the order of about 100° C., is no longer adequate. A heat distortion point of more than 108° C. is required in particular in car construction. In recent years, a number of ABS, ASA and EPAS moulding compositions which are based on α-methylstyrene, p-methylstyrene, maleic anhydride and N-substituted maleimides and have a higher heat distortion point have therefore been developed (compare DE-OS (German Published Specification) Nos. 3,332,327, 3,332,326, 1,950,599, 3,130,773; European Patent No. 0,002,961, DE-OS (German Published Specification) No. 3,406,417, U.S. Pat. Nos. 4,221,880, 4,129,615, German Patent No 2,343,408, DE-OS (German Published Specification) Nos. 330,161 and 3,303,864).

A higher heat distortion point here usually causes other disadvantages, however, such as more expensive production processes (for example when N-substituted maleimide derivatives are used) or a deterioration in the mechanical properties (for example in the case of mixtures containing random maleic anhydride copolymers). As a result of insufficient compatibility, mechanical stress often causes lamination phenomena or fibrous fractures or peeling at the interface between the thermoplastic copolymer ("matrix resin") and the graft copolymer ("impact strength graft component"). A frequent phenomenon with maleic anhydride/acrylonitrile resins is crosslinking during processing or an increase in the melt viscosity. DE-OS (German Published Specification) No. 3,332,326 describes a thermoplastic moulding composition of a styrene/acrylonitrile copolymer built up from styrene and/or a nuclear-alkylated styrene derivative and acrylonitrile, a styrene/maleic anhydride copolymer and a graft copolymer. The ratio of acrylonitrile to maleic anhydride portions in the moulding composition must fulfill a mathematical formula. The mechanical properties, such as toughness and rigidity, of components based on random maleic anhydride resins are generally inferior to those of styrene/acrylonitrile resins. In compatible polymer systems, the property values are usually between the limit values of the individual components. The object of development work is therefore to search for solutions with which the minimum possible content of maleic anhydride resin is sufficient, a high heat distortion point being achieved. It has now been found that the polymer blends according to the invention, which are based on α-methylstyrene/styrene/acrylonitrile copolymers and random maleic anhydride/styrene copolymers have a particularly balanced property profile in respect of properties in use. It was surprising that the outstanding combination of properties can be achieved only with selected α-methylstyrene/styrene/acrylonitrile copolymers.

The invention relates to thermoplastic moulding compositions of:

A. 90 to 30 parts by weight of a copolymer prepared by solution or bulk polymerization of $a_1$ 30 to 45% by weight of α-methylstyrene, $a_2$ 26 to 35% by weight of acrylonitrile and $a_3$ 44 to 20% by weight of styrene and/or p-methylstyrene, and with a content of incorporated acrylonitrile of 27–30% by weight, B. 5 to 60 parts by weight of a random copolymer of $b_1$ 18 to 24% by weight of maleic anhydride and $b_2$ 82 to 76% by weight of styrene and/or p-methylstyrene and C. 5 to 40 parts by weight of a graft polymer of 70 to 30% by weight of a mixture of $c_1$ a vinylaromatic and/or $C_1$–$C_4$-alkyl methacrylate and $c_2$ acrylonitrile, on 30 to 70% by weight of a rubber with a glass transition temperature of less than −10° C.

Particularly preferred copolymers A are obtained by continuous homogeneous polymerization in a continuously charged tank reactor under steady state and ideally mixed conditions at 100° to 140° C., with average residence times of more than 60 minutes and monomer conversions of 40 to 55% by weight in the presence of 0.5 to 0.005 mol per mol of total monomer of one or more polymerization initiators which disintegrate into free radicals and have a half-life of 5 seconds to 9 minutes at 130° C.

In order to obtain completely satisfactory results, it is necessary to observe the combination of the abovementioned conditions during the preparation of the copolymer resin A. In particular, suitable terpolymers are obtained when the following preparation conditions are fulfilled at the same time:

(1) continuous homogeneous polymerization in a continuously charged tank reactor under steady state and ideally mixed conditions, (2) a monomer use of $a_1$ 30 to 45% by weight of α-methylstyrene, $a_2$ 26 to 35% by weight of acylonitrile and $a_3$ 44 to 20% by weight of styrene and/or p-methylstyrene, (3) polymerization at 100°–140° C., (4) average residence times of longer than 60 minutes, preferably 90 to 300 minutes, (5) monomer conversions of 35 to 55% by weight, and (6) also using 0.5 to 0.005 mol %, based on $a_1+a_2+a_3$, of one or of a mixture of initiators which disintegrate into free radicals and have a disintegration half-life of 5 seconds to 9 minutes at 130° C.

The resulting copolymers A then have intrinsic viscosities of 0.45 to 0.85 dl/g, measured at 25° C. in dimethylformamide, and contain 27 to 30% by weight of incorporated acrylonitrile.

In a continuous homogeneous polymerization, the starting components are introduced continuously into a reactor at a constant feed rate and the reaction product is removed at the same rate, so that a constant level of fill with respect to time is established in the reactor. "Homogeneous" means that it is a one-phase system. The polymer formed is homogeneously soluble in its reaction mixture. The starting components are also homogeneously soluble in the reaction mixture. In the case of homogeneous bulk polymerization, the unreacted monomers act as solvents for the polymer formed. The bulk polymerization is distinguished by its high space/time yield in comparison with emulsion and bead polymerization. It is often advisable to add a small amount of solvent in bulk polymerization, for example 5 to 30% by weight of methyl ethyl ketone, ethylbenzene and the like.

These additives which reduce the viscosity are removed after the polymerization together with the unreacted monomers. The amount of α-methylstyrene of 30 to 45 percent by weight in the starting monomer mixture is critical. If the content is more than 45% by weight of α-methylstyrene, the molecular weight of the polymer formed falls rapidly as the amount increases, which can be seen by a decrease in the intrinsic viscosity to below 0.45 dl/g, measured at 25° C. in dimethylformamide (DMF). This manifests itself in a poorer mechanical strength of the resulting "ABS" moulding compositions. Although resins which have been prepared from a monomer mixture containing less than 30% by weight of α-methylstyrene and correspondingly more styrene yield "ABS" moulding compositions with a good mechanical strength, their heat distortion point decreases.

The combination of a polymerization temperature of 100° to 140° C. a residence time of longer than 60 minutes and steady state conversion of 35–55% by weight is critical to achieve particularly advantageous copolymers A which are of industrial interest. A polymerization temperature of more than 140° C., a steady state conversion of more than 55% by weight and a residence time shorter than 60 minutes allow the molecular weights of the resins and therefore the mechanical strength of the "ABS" to fall to the extent that the particularly advantageous copolymers A which are of industrial interest and which can be prepared with the abovementioned combination of measures can no longer be obtained. A lengthening of the polymerization times to more than 300 minutes, a reduction in the conversion to below 35% by weight and a reduction in the polymerization temperature to below 100° C. is not so critical as regards the properties of the polymer, but the process thereby becomes more uneconomical. At a lower polymerization temperature, the requirement of initiator for achieving a definite conversion increases enormously. The disintegration half-life of the initiator at the polymerization temperature - the half-life at 130° C. is used to characterize this parameter - is likewise critical. Although the polymerization is kept in progress with initiators which disintegrate more rapidly and have half-lives of less than 5 seconds at 130° C. the requirement increases and the molecular weights decrease. The process becomes more uneconomical and the products become defective. If initiators which disintegrate more slowly and have a disintegration half-life of longer than 9 minutes at 130° C. are used, there is the risk that portions of initiator which do not disintegrate collect in the reaction material and can cause the polymerization to run away in the event of small disturbances or can trigger off an undesirable after-polymerization during working up.

Examples of possible initiators are:

| | Half-life at 130° C. |
|---|---|
| tert.-butyl perneodecanoate | 7 seconds |
| azo-bis-(2,4-dimethylvaleronitrile) | 8 seconds |
| tert.-amyl perpivalate | 13 seconds |
| bis-(3,5,5-trimethylhexanoyl) peroxide | 13 seconds |
| dilauroyl peroxide | 15 seconds |
| tert.-butyl perneohexanoate | 15 seconds |
| didecanoyl peroxide | 19 seconds |
| tert.-butyl perpivalate | 20 seconds |
| dioctanoyl peroxide | 20 seconds |
| bis-(2-methylbenzoyl) peroxide | 22 seconds |
| azo-bis-(isobutyronitrile) | 32 seconds |
| tert.-butyl-per-2-ethylhexanoate | 68 seconds |
| dibenzoyl peroxide | 70 seconds |
| tert.-butyl perisobutyrate | 120 seconds |
| 1,1-bis-(t.-butylperoxy)-3,3,5-trimethylcyclohexane | 600 seconds |
| 1,1-bis-(t.-butylperoxy)-cyclohexane | 420 seconds |
| tert.-butyl per-3,5,5-trimethylhexanoate | 540 seconds |

The homogeneous polymerization can also be carried out in the presence of additives which reduce the viscosity, such as methyl ethyl ketone, ethylbenzene, toluene, tert.-butanol and the like, in amounts of 5 to 30% by weight, based on the sum of $a_1$, $A_2$ and $a_3$. This additive, which is customary with bulk polymerization, should be also be used only to the extent that it does not slow down the polymerization too much. The resins used according to the invention are distinguished by a high chemical and molecular homogeneity. The heterogeneity of the molecular weight is H=0.8 to 1.4, calculated from the formula $$H = \frac{M_w}{M_n} - 1$$

The heat distortion points of the pure resins are in the range from 110° to 118° C. measured by the Vicat B method.

Random copolymers of styrene and maleic anhydride are known and can be prepared by homogeneous bulk polymerization of styrene and maleic anhydride in a continuously operated ideally mixed tank reactor with incomplete conversions and subsequent removal of the unreacted monomers, for example in accordance with the doctrine of DAS (German Published Specification) No. 2,724,360 or DOS (German Published Specification) No. 2,343,871. The maleic anhydride content b1 in the copolymer B is critical. Less than 18% by weight of maleic anhydride in copolymer B leads to incompatibilities in the blend with A. The fact that a compatible polymer system is present here can be seen from the torsional vibration test and from the optical dispersion curves of the mixture and of the starting components. The physical parameters obey simple rules of mixing. The maleic anhydride copolymers B are built up randomly, that is to say all the molecular chains have about the same composition. It is essential that the copolymer B contains no alternatingly built-up styrene/maleic anhydride copolymer. The intrinsic viscosity of the copolymers B is 0.35 to 0.7 dl/g, measured at 25° C. in DMF, and the heterogeneity of the molecular weight H is 0.8 to 1.6, calculated from the formula:

$$H = \frac{\overline{M_w}}{\overline{M_n}} - 1$$

The heat distortion point of the pure resins is in the range from 135° to 155° C. measured by the Vicat B method.

Some of the styrene and/or p-methylstyrene $b_2$ in copolymer B can also be replaced by methyl methacrylate. In total, polymer B can contain up to 30% by weight of copolymerized methyl methacrylate.

It was surprising that the compatible blends of copolymers A. and B. show no increase in the melt viscosity at 260° C. since in the systems with SAN described in DE-OS (German Published Specification) 3,332,327 exhibit a marked increase in the melt viscosity and crosslinking at the same acrylonitrile content and the same component B at 260° C.

The compatible mixture of copolymer A and B is used as a matrix resin for the preparation of "ABS moulding compositions" with a high heat distortion point. The resin components are usually mixed with a graft rubber component (C) in the melt in kneaders or internal mixers or on mills or extruders. It is also possible, however, to prepare a polymer formulation by stepwise polymerization, for example first by preparation of the rubber phase, onto which the graft content is applied by polymerization. The resin phase is then polymerized.

The graft rubber components (C) to be used are known. They can be obtained by polymerization of styrene, methyl methacrylate, p-methylstyrene or α-methylstyrene with acrylonitrile or maleic anhydride in the presence of a rubber base. The base is also called a graft substrate. It is found that during grafting onto the substrate, the entire monomer is not grafted on, but some of the monomer polymerizes to give free resin. These graft polymers can be prepared in a known manner by free radical polymerization of the monomers in the presence of the rubber in bulk, emulsion, suspension or solution or by combined processes, such as bulk/suspension polymerization or solution/precipitation polymerization.

Natural and synthetic rubbers are used as the graft base.

The rubbers used for the grafting polymerization can be non-crosslinked, partly crosslinked or highly crosslinked. If, for example, solution grafting polymerization is used, non-crosslinked rubbers are employed, and virtually all rubbers, whether crosslinked or non-crosslinked, can be used for emulsion grafting as long as they are also present as an emulsion. The graft polymers (C) themselves in all cases contain, however, at least partly crosslinked rubbers, preferably rubbers with a degree of crosslinking of at least 50% by weight. This means that even if non-crosslinked rubbers are used as starting materials for preparation of the graft polymers (C), at least partial crosslinking of the rubber contents must take place during the actual grafting polymerization of vinylaromatic, acrylonitrile, methyl methacrylate or MA on the rubber.

By suitable graft polymers (C) according to the invention there are thus to be understood at least partly crosslinked polymers. The graft polymers usually have at least a gel content (that is to say an undissolved portion as a measure of the degree of crosslinking) of at least 15% by weight, preferably at least 50% by weight and in particular at least 60% by weight, measured at 23° C. in organic solvents.

The grafting polymerization of the monomers mentioned, if appropriate as a mixture with small amounts of comonomer, is preferably initiated by free radicals or heat.

Natural and synthetic rubbers in soluble or non-crosslinked form are used as the graft base (C 1). Suitable synthetic rubbers are homo- and copolymers of optionally halogen-substituted, conjugated dienes with 4 to 8 carbon atoms, such as butadiene, isoprene, chloroprene and copolymers thereof with styrene and/or acrylonitrile. The copolymers can be built up randomly or in blocks. In the case of products in block form, they can be two-block polymers of the formula AB or three-block polymers of the formula ABA, as well as star-shaped block polymers, for example of the formula $(ABA)_xY$, wherein A, for example, represents styrene, B represents butadiene and Y represents a polyfunctional coupling reagent, such as, for example, $SiCl_4$, $S_2Cl_2$, divinylbenzene, epoxidized fatty acids and the like; x is of the order of magnitude of 2 to 5. If soluble rubber is used, polybutadienes with a high cis-content of double bonds of more than 55% in the polymer chain, it being possible for the content of 1,2-vinyl double bonds to be up to 15%, based on all the double bonds, and linear as well as star-shaped styrene/butadiene block polymers with a styrene content of 5 to 45% by weight, are preferably used.

Another class of synthetic rubbers consists of ethylene/propylene co- and terpolymers. They contain 70 to 30 parts by weight of ethylene per 30 to 70 parts by weight of propylene. Terpolymers with 4 to 15% by weight of, for example, 5-ethylidenenorbornene, dicyclopentadiene, hexa-1,4-diene or 2,2,1-bicycloheptadiene with about 1 to 20 C=C double bonds per 1,000 atoms are advantageous. Graft components based on these so-called EPDM or APTK rubbers are distinguished by a particularly good resistance to weathering. Graft components which are resistant to weathering also include the class of polyethylene-co-vinyl acetates (EVA) and acrylate elastomers. The EVA elastomers contain 30 to 85% of copolymerized vinyl acetate and can be esterified in the side chain with unsaturated carboxylic acids, for example acrylic or methacrylic acid, so that they can be grafted more easily, and the EVA copolymers can also be partly hydrolyzed and have OH numbers of 1 to about 100 mg of KOH/g of substance. The acrylate rubbers are usually copolymers of $C_2$–$C_8$-alkyl esters of acrylic acid, such as, for example, ethyl, n- or iso-propyl, n-butyl, iso-butyl, tert.-butyl or 2-ethylhexyl acrylate. Other comonomers are, inter alia, methacrylates with 1 to 14 C atoms in the ester part, butadiene and vinylalkyl ethers with 1 to 18 C atoms in the ether part. If appropriate, these acrylate rubbers contain small amounts of polyfunctional vinyl or allyl monomers for crosslinking of the acrylate rubber. Such functional monomers are, for example, alkylene glycol di(meth)acrylates, (meth)acrylic acid vinyl esters, triallyl cyanurate, butadiene, isoprene, divinylbenzene and the like.

The graft components (C) can also be built up in the form of several shells, for example they can consist of a polybutadiene, polystyrene, polymethyl methacrylate or SAN polymer core surrounded by a polyacrylic acid ester. Graft substrates based on polybutadiene and polyacrylic acid esters, such as are described in detail, for example, in the publications DE-OS (German Published Specification) Nos. 3,039,114, 3,039,115, 3,117,052 and 3,210,284, European Patent Nos. 0,063,263 and 0,064,692, occupy a preferred position.

The constituents A., B. and C. are prepared separately and are mixed by the conventional mixing techniques of preparation of polymer blends on mills, kneaders, internal mixers or screw machines by solution or melt compounding. Customary additives are lubricants, stabilizers, flameproofing agents, pigments, reinforcing fillers, mineral fillers, matting agents and the like. The polymer blend moulding compositions are used to prepare all types of moulding compositions. They are particularly distinguished by good flow properties during injection moulding or extrusion, by a high heat distortion point and strength and by a good joint line strength. In particular, they exhibit no fibrous fracturing or delamination of the shaped articles under mechanical stress. The polymer blends claimed have an excellent light colour in the crude state and can be processed without discoloration at temperatures of 240° to 280° C. with short cycle times under high machine utilization without after-crosslinking occurring.

The "ABS moulding compositions" prepared from the resins according to the invention have a heat distortion point of at least 110° C. preferably 115° to 130° C. measured by the Vicat B method. Compared with ABS moulding compositions based on styrene/acrylonitrile copolymers in blends with styrene/maleic anhydride copolymers with the same MA content in the styrene/MA copolymer, the heat distortion point in practice is 5° to 10° C. higher.

The invention is illustrated in more detail by the following examples. In the examples, unless indicated otherwise, parts are parts by weight and percentages are percentages by weight.

Preparation of the resin A 1,000 parts of a mixture of monomers with a composition corresponding to Table 1 were taken in a jacketed vessel equipped with an internal thermometer, stirrer, inlet and outlet and were heated to 130° C. (or 125° C.). A monomer stream of the same composition was then metered in and at the same time the same amount of polymer solution was removed from the vessel so that the desired residence time resulted in the vessel and the level of fill was maintained. The amount of initiator shown in Table 1 was added continuously to the monomer intake stream. After about 6 hours, a constant conversion of about 30–65% had been established. The polymer solution was then freed from the unreacted monomers and solvents in a devolatilization extruder and granulated.

The resins of copolymer B were prepared by the process described in the literature, compare, for example, DE-DAS (German Published Specification) No. 2,724,360 or DE-OS (German Published Specification) No. 2,343,871 and are summarized in Table 2.

Preparation of the blends

The components were mixed in accordance with Table 3 and compounded at 230° C. on a conical twin-screw extruder. The test specimens were injection-moulded at 240° C.

A graft rubber which was prepared by grafting of 50 parts of styrene and acrylonitrile in a weight ratio of 72/28 onto 50 parts of an emulsion-polymerized polybutadiene, the particle diameter being between 0.1 and 0.4 μm, was used as rubber component C in all the examples. 2 parts of lubricant were also added to the graft rubber.

To evaluate the tendency of the moulding compositions towards crosslinking, the moulding compositions were heated to 260° C. or 280° C. and kept at this temperature. The flow properties were then determined by the MFI method after 5, 10, 15 and 20 minutes.

TABLE 1

| | Resin component A and comparison component D | | | | | | | | | |
|---|---|---|---|---|---|---|---|---|---|---|
| | Monomers used | | | | | | Initiator | | Polymer | Acrylo- |
| Product | Styrene (parts) | α-Methyl-styrene (parts) | p-Methyl-styrene (parts) | Acrylo-nitrile (parts) | Temperature (°C.) | Conversion (%) | tert.-butyl perpivalate (parts) | Residence time (hours) | 25 DMF (dl/g) | Vicat B (°C.) | nitrile (% by weight) |
| A$_1$ | 30 | 40 | — | 30 | 130 | 38 | 0.051 | 1.3 | 0.56 | 115 | 27.6 |
| A$_2$* | 35 | 35 | 6 | 30 | 125 | 43 | 0.037 | 2.2 | 0.63 | 112 | 27.4 |
| A$_3$ | 30.6 | 38.8 | — | 30.6 | 125 | 34 | 0.076 | 1.6 | 0.60 | 117 | 27.7 |
| A$_4$ | — | 35 | 35 | 30 | 130 | 43 | 0.030 | 1.9 | 0.60 | 113 | 27.6 |
| D | 70 | — | — | 30 | prepared according to DAS (German Published Specification) 2,724,360 | | | | 0.55 | 103 | 27.6 |

*+6 parts of ethylbenzene
a Index n   Impact strength according to DIN 53 453. In each case 10 small standard bars were tested. If not all the bars are broken at a given impact stress, the impact stress and the number of bars broken are indicated afterwards.
a Index k   Notched impact strength according to DIN 53 453
Vic. B      Vicat softening point VST/B 120 according to DIN 53 460
MFI         Melt flow index according to DIN 53 735 at 220° C.
MA          Maleic anhydride
MMA         Methyl methacrylate
DMF         Dimethylformamide Comparison resin D This is a polystyrene-co-acrylonitrile bulk resin (SAN) which has been prepared in accordance with DAS (German Published Specification) 2,724,360.

TABLE 2

| | Resin component B prepared in accordance with the process of DE-DAS (German Published Specification) 2,724,360 | | | | |
|---|---|---|---|---|---|
| | Composition | | | | |
| Product | Styrene (parts) | MA (parts) | MMA (parts) | 25 DMF (dl/g) | Vicat B (°C.) |
| B$_1$ | 76 | 24 | — | 0.55 | 148 |
| B$_2$ | 78.5 | 21.5 | — | 0.53 | 143 |
| B$_3$ | 78 | 22 | — | 0.57 | 144 |
| B$_4$ | 80* | 20 | — | 0.46 | 141 |

TABLE 2-continued

Resin component B
prepared in accordance with
the process of DE-DAS (German
Published Specification) 2,724,360

| Product | Composition | | | 25 DMF (dl/g) | Vicat B (°C.) |
|---|---|---|---|---|---|
| | Styrene (parts) | MA (parts) | MMA (parts) | | |
| $B_5$ | 62 | 22 | 6 | 0.59 | 144 |

*Styrene/p-methylstyrene in a weight ratio of 2:1

TABLE 3

Composition and technological data of the blends

| | Composition (parts) | | | | | $a_n$ (kJ/m$^2$) | $a_k$ (kJ/m$^2$) | Vicat B (°C.) | MFI 220/10 (g/10 min) | $H_c30$ (N/mm$^2$) | Decrease in melt viscosity |
|---|---|---|---|---|---|---|---|---|---|---|---|
| 1 | 38.75 $A_1$ | 38.75 $B_2$ | 22.5 | C | 48.6 | 3.9 | 119 | — | 126 | none |
| 2 | 46.5 $A_1$ | 31.0 $B_2$ | 22.5 | C | 54.6 | 5.2 | 117 | — | 125 | none |
| 3 | 63.0 $A_2$ | 7.0 $B_3$ | 30.0 | C | | 8.4 | 111 | 5.5 | 115 | none |
| 4 | 56.0 $A_2$ | 14.0 $B_3$ | 30.0 | C | | 7.8 | 112 | 5.1 | 115 | none |
| 5 | 49.0 $A_2$ | 21.0 $B_3$ | 30.0 | C | | 8.3 | 113 | 4.5 | 112 | none |
| 6 | 42.0 $A_2$ | 28.0 $B_3$ | 30.0 | C | | 9.6 | 113 | 3.9 | 105 | none |
| 7 | 47.0 $A_1$ | 31.4 $B_2$ | 21.6 | C | 54.6 | 5.2 | 117 | — | 125 | — |
| 8 | 36.0 $A_3$ | 36.0 $B_1$ | 28.0 | C | 72(4) | 8.8 | 118 | 3.4 | 108 | — |
| 9 | 36.0 D | 36.0 $B_1$ | 28.0 | C | — | 5.6 | 115 | 6.9 | 112 | marked |
| 10 | 42.2 $A_3$ | 28.8 $B_5$ | 28.0 | C | — | 8.7 | 115 | 4.1 | 110 | — |
| 11 | 50.0 $A_4$ | 20.0 $B_2$ | 30.0 | C | — | 8.0 | 113 | 4.2 | 114 | none |

Blend 9: Comparison Example

We claim:
1. A thermoplastic moulding composition comprising
(A) 90 to 30 parts by weight of a copolymer prepared by solution or bulk polymerization of an initial monomer mixture comprising
   (i) 30 to 45% by weight of α-methylstyrene,
   (ii) 26 to 35% by weight of acrylonitrile, and
   (iii) 44 to 20% by weight of styrene, p-methylstyrene or a mixture thereof,
producing the copolymer with a content of incorporated acrylonitrile of 27 to 30% by weight,
(B) 5 to 60 parts by weight of a random copolymer of
   (i) 18 to 24% by weight of maleic anhydride and
   (ii) 82 to 76% by weight of styrene, p-methylstyrene or a mixture thereof,
some of the styrene, p-methylstyrene or both of component (ii) being replacable by methyl methacrylate so as to yield up to 30% by weight of methyl methacrylate in copolymer (B),
(C) 5 to 40 parts by weight of a partly crosslinked graft copolymer having a gel content of at least 15% by weight of
   (i) 70 to 30% by weight of a mixture of
      (a) a vinylaromatic, $C_1$–$C_4$ alkyl methacrylate or a mixture thereof, and
      (b) acrylonitrile, on
   (ii) 30 to 70% by weight of a rubber with a glass transition temperature of less than −10° C.

2. A moulding composition according to claim 1 in which copolymer (A) has been obtained by continuous homogeneous solution polymerization in a continuously charged tank reactor under steady state and ideally mixed conditions at 100° to 140° C., with average residence times of more than 60 minutes and monomer conversion of 40 to 55% by weight in the presence of 0.5 to 0.005 mol per mol of total monomer of one or more polymerization initiators which disintegrate into free radicals and have a half-life of 5 seconds to 9 minutes at 130° C.

3. A moulding composition according to claim 1, in which the rubber of component (ii) of graft polymer (C) has a degree of crosslinking of at least 50% by weight.

* * * * *